United States Patent [19]
Hieda et al.

[11] Patent Number: 5,440,650
[45] Date of Patent: Aug. 8, 1995

[54] IMAGE PROCESSING SYSTEM FOR INSPECTION OF OVERPRINTED MATTER

[75] Inventors: Takashi Hieda, Nagoya; Yoshio Yokoyama, Anjo, both of Japan

[73] Assignee: Nippondenso Co., Ltd., Kariya, Japan

[21] Appl. No.: 215,668

[22] Filed: Mar. 22, 1994

Related U.S. Application Data

[63] Continuation of Ser. No. 817,812, Jan. 8, 1992, abandoned.

[30] Foreign Application Priority Data

Jan. 8, 1991 [JP]  Japan .................................. 3-012870

[51] Int. Cl.6 .............................................. G06K 9/00
[52] U.S. Cl. .................................... 382/112; 382/309; 356/394; 348/86
[58] Field of Search ............... 356/388, 392, 393, 394; 382/1, 8, 54, 22, 30, 34, 48; 348/86, 94, 95; G06K 9/00, 9/62, 9/68, 9/20, 9/40, 9/48; H04N 7/00; G01B 9/08, 11/00

[56] References Cited

U.S. PATENT DOCUMENTS 4,778,745 10/1988 Leung .................................. 356/394
4,845,558  7/1989 Tsai et al. ........................... 358/107

*Primary Examiner*—Jose L. Couso
*Attorney, Agent, or Firm*—Cushman, Darby & Cushman

[57] ABSTRACT

An image processing system for inspection of an overprinted matter having at least first and second layers different in lightness under appropriate illumination, wherein a digital image of the surface of the overprinted matter is formed, first and second reference images representing each normal image of the first and second layers are memorized, a first deviation between a first boundary of the first reference image to the second reference image and a portion of the digital image corresponding with the first boundary is measured, a second deviation between a second boundary of the second reference image to the first reference image and a portion of the digital image corresponding with the second boundary is measured, the first reference image is corrected to a first corrected reference image in such a manner as to eliminate the measured first deviation, the second reference image is corrected to a second corrected reference image in such a manner as to eliminate the measured second deviation, a finally corrected reference image is produced on a basis of logical sum of the first and second corrected reference images, and a matching process of the finally corrected reference image and the digital image is carried out for discrimination of the quality of the surface of the overprinted matter.

5 Claims, 7 Drawing Sheets

IMAGE PROCESSING SYSTEM FOR INSPECTION OF OVERPRINTED MATTER

This is a continuation of application Ser. No. 07/817,812, filed on Jan. 8, 1992, now abandoned.

BACKGROUND OF THE INVENTION

1. Field of the Invention

The present invention relates to an image processing method and system for inspection of an overprinted matter such as a multicolor print, an LSI wafer formed with multilayer patterns or the like.

2. Discussion of the Prior Art

In a conventional image processing system of this kind for inspection of an overprinted matter such as a two-color print, a pictorial image of the printed matter is processed by a pattern matching process for comparison with a reference image. With such a pattern matching process, a positional deviation of the color layers on the printed matter is inevitably detected when slight defects have been detected at a portion adjacent a boundary of the color layers. Such detection of the positional deviation causes an unwanted noise in inspection of the quality of the printed matter.

SUMMARY OF THE INVENTION

It is, therefore, a primary object of the present invention to provide an improved image processing system capable of inspecting the surface of an overprinted matter without causing any problems described above.

According to the present invention, the object is attained by providing an image processing system for inspection of an overprinted matter having at least first and second layers different in lightness under appropriate illumination, which system comprises means for forming a digital image of the surface of the overprinted matter, memory means for memorizing first and second reference images representing each normal image of the first and second layers of the overprinted matter, first measurement means for measuring a first deviation between a first boundary of the first reference image to the second reference image and a portion of the digital image corresponding with the first boundary and for determining the measured first deviation as a first deviation amount, second measurement means for measuring a second deviation between a second boundary of the second reference image to the first reference image and a portion of the digital image corresponding with the second boundary and for determining the measured second deviation as a second deviation amount, first correction means for correcting the position of the first reference image to a first corrected reference image in such a manner as to eliminate the first deviation amount, second correction means for correcting the position of the second reference image to a second corrected reference image in such a manner as to eliminate the second deviation amount, superimposed means for producing a finally corrected reference image based on a logical sum of the first and second corrected reference images, matching process means for carting out a matching process of the finally corrected reference image and the digital image, and discrimination means for discriminating the quality of the surface of the overprinted matter based on a result of the matching process.

In a preferred embodiment of the present invention, the said first measurement means includes a subtractor for calculating a difference between pixel lightness of a predetermined area of tile first reference image adjacent the first boundary and pixel lightness of an area of the digital image corresponding with the predetermined area of the first reference image, and the second measurement means includes a subtractor for calculating a difference between pixel lightness of a predetermined area of the second reference image adjacent the second boundary and pixel lightness of an area of the digital image corresponding with the predetermined area of the second reference image.

BRIEF DESCRIPTION OF THE DRAWINGS

Other objects, features and advantages of the present invention will be more readily appreciated by the following detailed description of a preferred embodiment thereof when taken together with the accompanying drawings, in which.

DESCRIPTION OF THE PREFERRED EMBODIMENT

Figure 1:
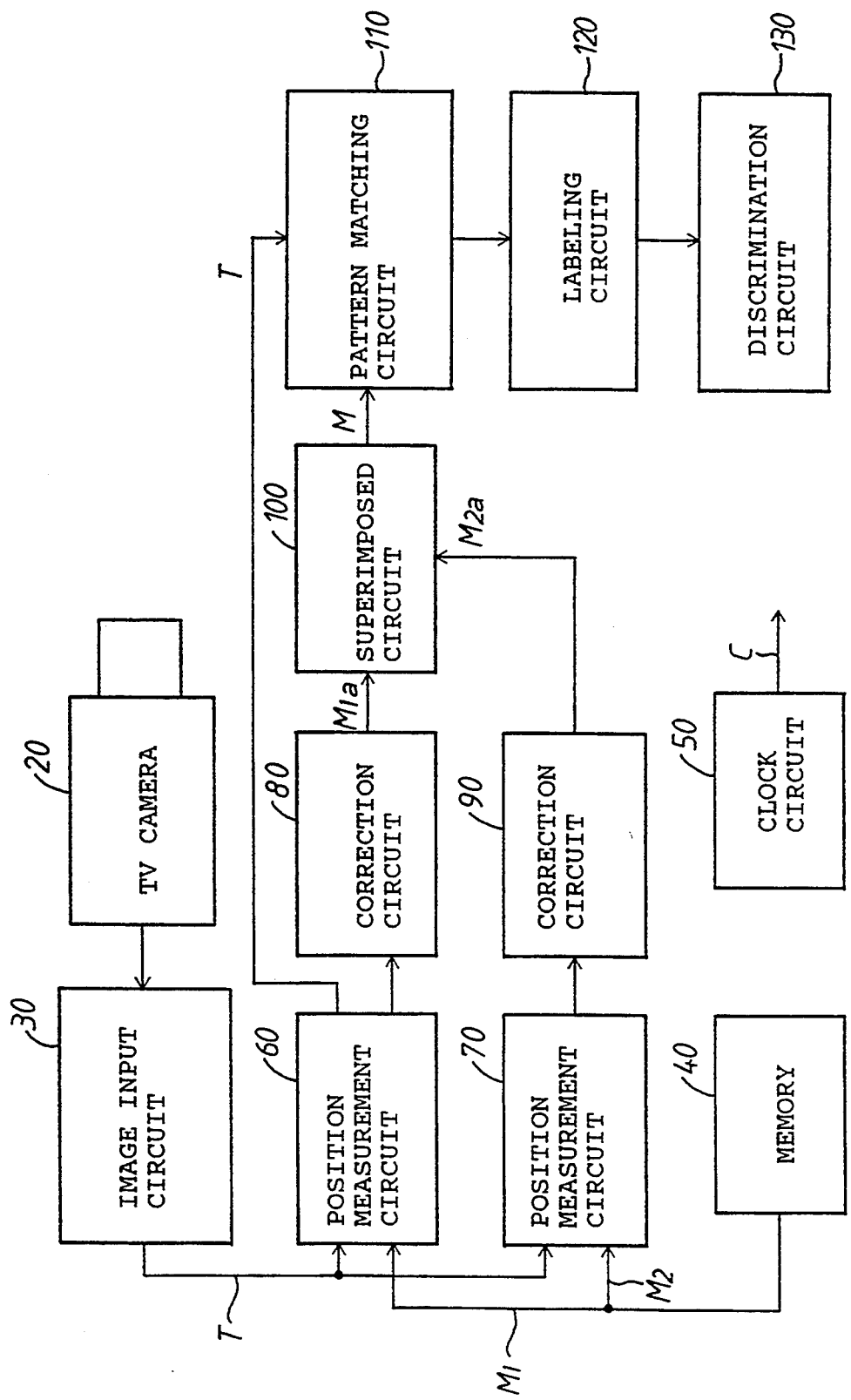
FIG. 1 is a block diagram of an image processing system in accordance with the present Invention.
Figure 2:
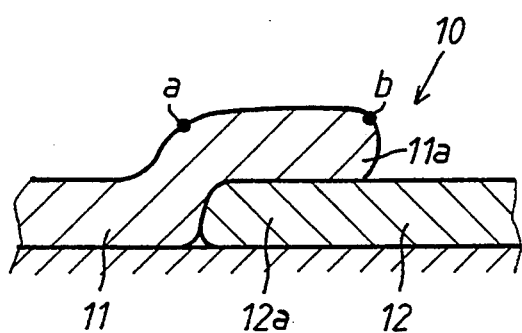
FIG. 2 is a sectional view of a two-color print showing a boundary of upper and lower printed layers on the print.
Figure 3:
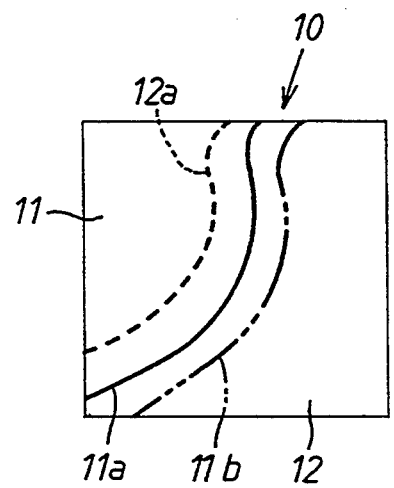
FIG. 3 is a plan view of the two-color print.
Figure 4:
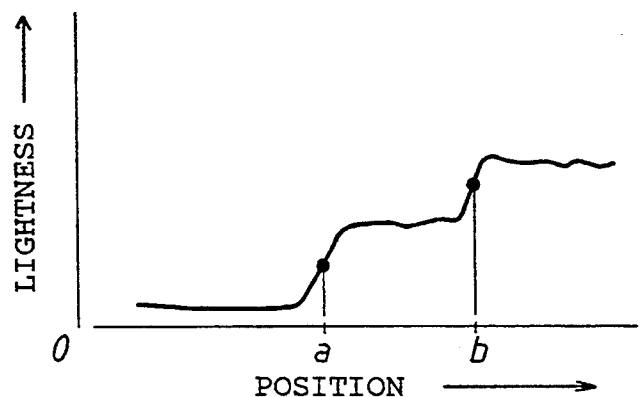
FIG. 4 is a graph showing a distribution of lightness on the two-color print.

In FIG. 1 of the drawings, there is illustrated an image processing system of the present invention adapted to inspect a boundary of overprinted layers 11 and 12 of a two-color print 10 shown in FIGS. 2 and 3. In the two-color print 10, the upper printed layer 11 is printed over the left-hand edge 12a of the lower printed layer 12 at its right-hand edge 11a. In the case that the upper printed layer 11 is black while the lower printed layer 12 is white, the lightness at a point b of the upper printed layer 11 under appropriate illumination becomes higher than that at a point a of the upper printed layer 11.(see FIGS. 2 and 4) The image processing system includes a television camera 20 which is arranged to be focused on the boundary of the overprinted layers 11 and 12 under appropriate illumination for issuing an electrical image data. An image input circuit 30 in the form of an analog-to-digital converter is connected to the camera 20 to convert the image data into a digital Image data T.

Figure 5:
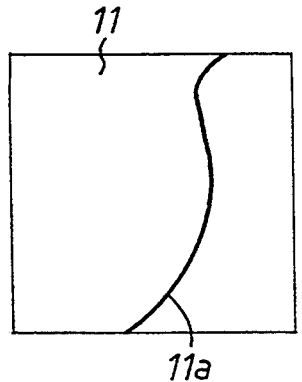
FIG. 5 is a plan view showing a normally printed upper layer of the print.
Figure 6:
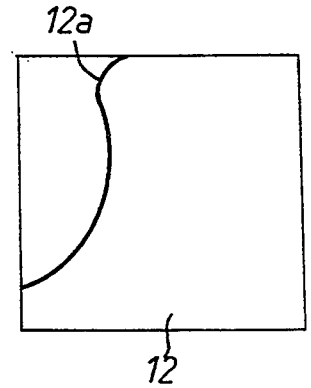
FIG. 6 is a plan view showing a normally printed lower layer of the print.
Figure 7:
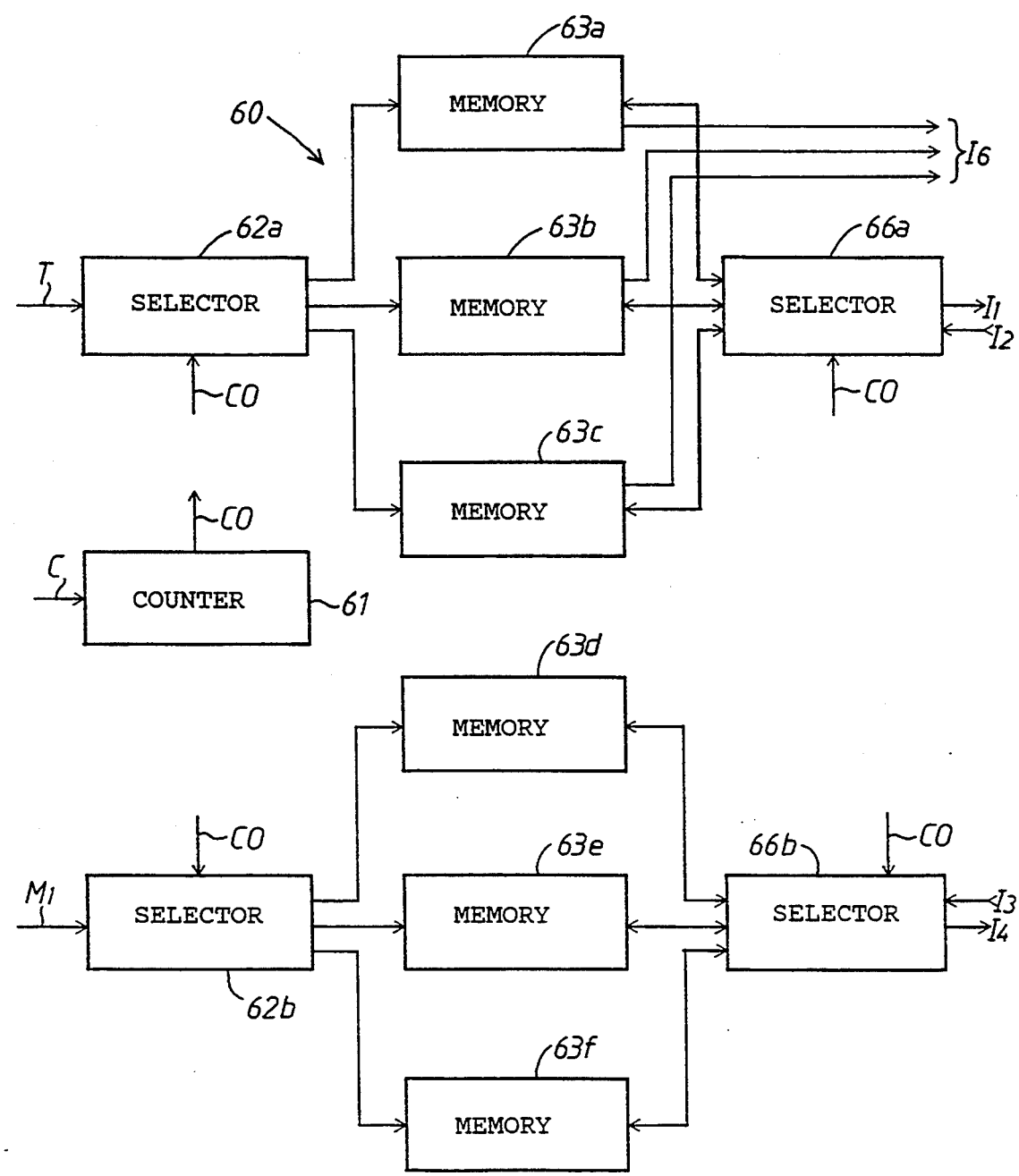
FIG. 7 is a block diagram showing the front part of a first position measurement circuit.

The image processing system further includes a memory 40, a clock circuit 50 and position measurement circuits 60, 70. The memory 40 is arranged to memorize an image indicative of a normally printed state of the upper printed black layer 11 as a first reference image data $M_1$ and to memorize an image indicative of a normally printed state of the lower printed white layer 12 as a second reference image data $M_2$. (see FIGS. 5 and 6) The clock circuit 50 is arranged to successively produce a clock signal C at a predetermined frequency. Both the position measurement circuits 60 and 70 are connected to the image input circuit 30 and the memory 40. As shown in FIG. 7, the position measurement circuit 60 includes a counter 61 which is applied with the clock signal C from clock circuit 50 to produce a carry-out signal CO therefrom at each time when counted a predetermined number of clock signals C. In response to the carry-out signal CO from counter 61, a selector 62a causes memories 63a, 63b, 63c to successively memorize the digital image data T from image input circuit 30 therein at a predetermined number of bits, for instance, 8 bits. The selector 62a is in the form of a counter which is arranged to apply the digital image data T to the memories 63a to 63c in sequence at the predetermined number of bits with delay of a time defined by the period of the carry-out signal CO. On the other hand, a selector 62b causes memories 63d, 36e, 63f to successively memorize therein the first reference image data $M_1$ from memory 40 in response to the carry-out signal CO at the predetermined number of bits. The selector 62b is in the form of a counter which is arranged to apply the first reference image data $M_1$ to the memories 63d to 63f in sequence at the predetermined number of bits with delay of the time defined by the period of the carry-out signal CO.

Figure 8:
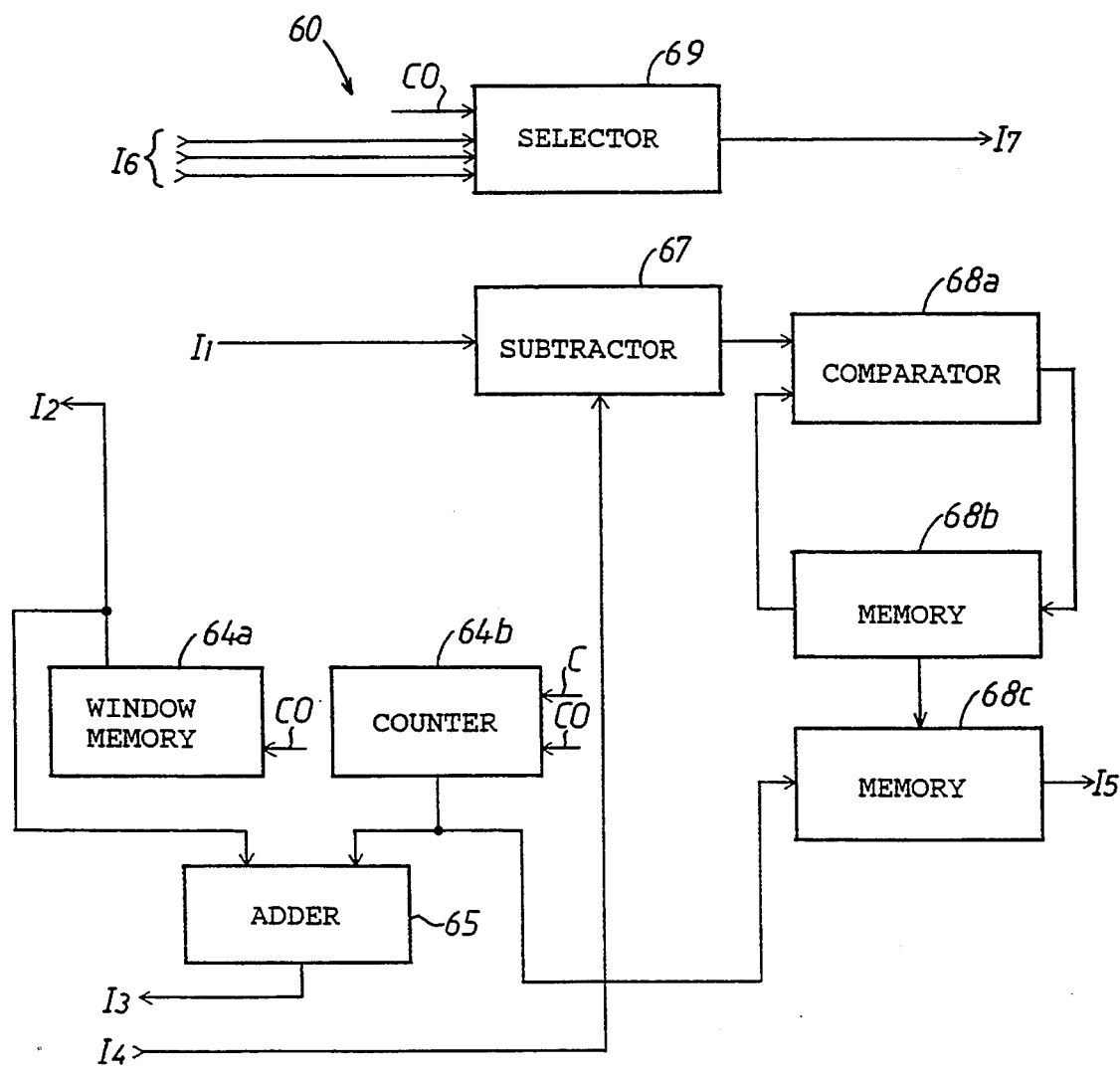
FIG. 8 is a block diagram showing the rear part of the first position measurement circuit.

As shown in FIG. 8, the position measurement circuit 60 includes a window memory 64a arranged to preliminarily memorize a first window coordinate data for detection of a pixel position. The first window coordinate data represents each window coordinate for determining each pixel portion deviated in a first predetermined bit area from a pixel portion of the second reference image data $M_2$ corresponding with the left-hand edge 12a of the lower printed layer 12. In this embodiment, the first bit area is determined to correspond with an estimated area deviated from a normal position of the left-hand edge 12a of the lower printed layer 12. Thus, the window memory 64a successively issues therefrom a window coordinate signal representing each window coordinate of the first window coordinate data in response to the carry-out signal CO from counter 61. A counter 64b is arranged to be reset in response to the carry-out signal CO successively applied thereto from counter 61 for producing a count signal defined by the period of the carry-out signal CO. An adder 65 is arranged to successively add a value of the count signal from counter 64b to a value of the window coordinate signal from window memory 64a for successively producing the resultant of the addition as an address signal.

As shown in FIG. 7, the position measurement circuit 60 further includes a selector 66a arranged to be applied with the window coordinate signal from window memory 64a as an address signal. When applied with the address signal, the selector 66a successively reads out the respective memorized data from memories 63c, 63a, 63b in response to the carry-out signal CO from counter 61 and applies them to a subtractor 67 shown in FIG. 8. In this instance, the memorized data of memories 63c, 63a, 63b are addressed by the address signal from window memory 64a to be read out by the selector 66a, and the read out data may correspond with the memorized data of window memory 64a. The selector 66a is in the form of a counter which is arranged to read out first the memorized data from the memory 63c and to read out the memorized data from the memories 63a, 63b in sequence. On the other hand, a selector 66b is provided to be applied with the address signal from adder 65 for successively reading out the memorized data from memories 63f, 63d, 63c in response to the carry-out signal CO from counter 61 and applying them to the subtractor 67. In this instance, the memorized data of memories 63f, 63d, 63e are addressed by the address signal from adder 65, and the read out data is deviated from the memorized data of window memory 64a by the predetermined number of bits.

The subtractor 67 is arranged to obtain an absolute subtraction value indicative of a difference between output data of selectors 66a and 66b. A comparator 68a is provided to compare the absolute subtraction value from subtractor 67 with a memorized data of a memory 68b and to renew the memorized data of memory 68b with a smaller data of the compared data. A memory 68c is arranged to be applied with the count signal from counter 64b as an address signal for producing the data position of the address signal as a first position data when the memorized data of memory 68b becomes a minimum value. The position measurement circuit 60 further includes a selector 69 arranged to successively read out the memorized data of memories 63b, 63c, 63a in response to the carry-out signal CO from counter 61 and to apply them as a digital image data T to a pattern matching circuit 110 shown in FIG. 1.

Figure 9:
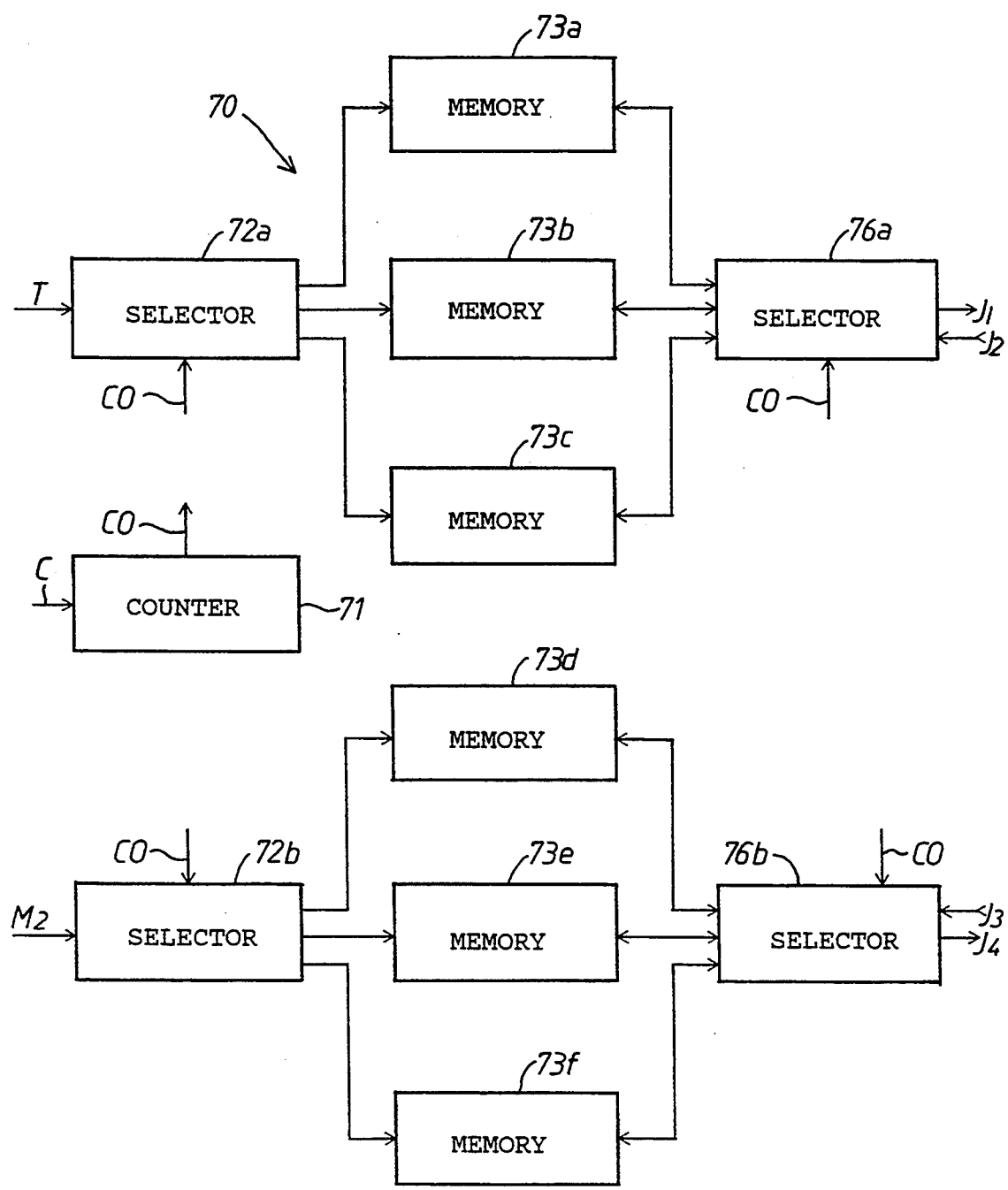
FIG. 9 is a block diagram showing the front part of a second position measurement circuit.

As shown in FIG. 9, the position measurement circuit 70 includes a counter 71 which is applied with the clock signal C from clock circuit 50 to produce a carry-out signal CO therefrom at each time when counted a predetermined number of clock signals C. In response to the carry-out signal CO from counter 61, a selector 72a causes memories 73a, 73b, 73c to successively memorize the digital image data T from image input circuit 30 therein at a predetermined number of bits, for instance, 8 bits. The selector 72a is in the form of a counter which is arranged to apply the digital image data T to the memories 73a to 73c in sequence at the predetermined number of bits with delay of a time defined by the period of the carry-out signal CO. On the other hand, a selector 72b causes memories 73d, 73e, 73f to successively memorize therein the second reference image data $M_2$ from memory 40 in response to the carry-out signal CO at the predetermined number of bits. The selector 72b is in the form of a counter which is arranged to apply the second reference image data $M_2$ to the memories 73d to 73f in sequence at the predetermined number of bits with delay of the time defined by the period of the carry-out signal CO.

Figure 10:
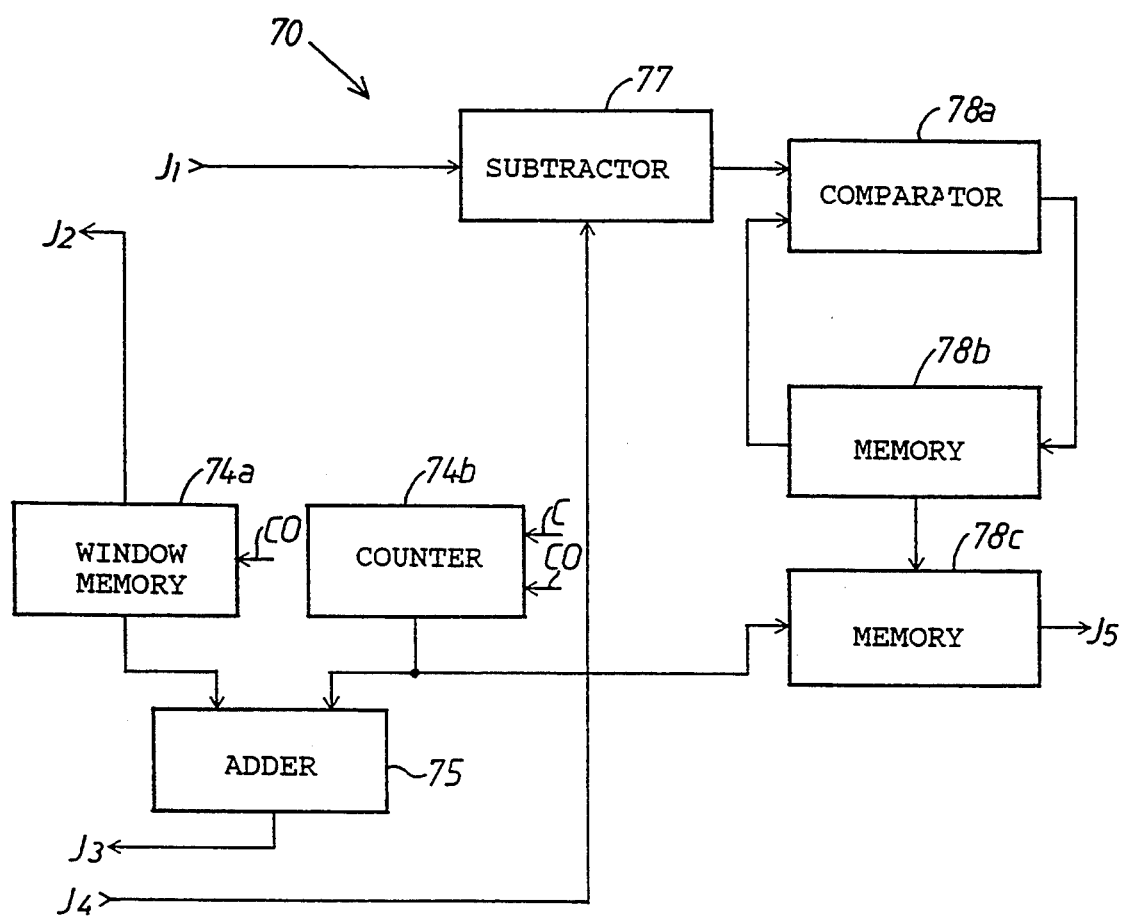
FIG. 10 is a block diagram showing the rear part of the second position measurement circuit.

As shown in FIG. 10, the position measurement circuit 70 further includes a window memory 74a arranged to preliminarily memorize a second window coordinate data for detection of a pixel position. The second window coordinate data represents each window coordinate for determining each pixel portion deviated In a second predetermined, bit area from a pixel portion of the second reference image data $M_2$ corresponding with the left-hand edge 12a of the lower printed layer 12. In this embodiment, the second bit area is determined to correspond with an estimated area deviated from a normal position of the right-hand edge 11a of the upper printed layer 11. Thus, the window memory 74a successively produces a window coordinate signal representing each window coordinate of the second window coordinate data in response to the carry-out signal CO from counter 71. A counter 74b is arranged to be reset in response to the carry-out signal CO successively applied thereto from counter 71 for producing a count signal defined by the period of the carry-out signal CO. An adder 75 is arranged to successively add a value of the count signal from counter 74b to a value of the window coordinate signal from window memory 74a for successively producing the resultant of the addition as an address signal.

As shown in FIG. 9, the position measurement circuit 70 further includes a selector 76a arranged to be applied with the window coordinate signal from window memory 74a as an address signal When applied with the address signal, the selector 76a successively reads out the respective memorized data from memories 73c, 73a, 73b in response to the carry-out signal CO from counter 71 and applies them to a subtractor 77 shown in FIG. 10. In this instance, the memorized data of memories 73c, 73a, 73b are addressed by the address signal from window memory 74a to be read out by the selector 76a, and the read out data may correspond with the memorized data of window memory 74a. The selector 76a is in the form of a counter which is arranged to read out first the memorized data from memory 73c and to read out the memorized data from memories 73a, 73b in sequence. On the other hand, a selector 76b is provided to be applied with the address signal from adder 75 for successively reading out the memorized data from memories 73f, 73d, 73e in response to the carry-out signal CO from counter 71 and applying them to the subtractor 77. In this instance, the memorized data of memories 73f, 73d, 73e are addressed by the address signal from adder 75, and the read out data is deviated from the memorized data of window memory 74a by the predetermined number of bits.

The subtractor 77 is arranged to obtain an absolute subtraction value indicative of a difference between output data of selectors 76a and 76b. A comparator 78a is provided to compare the absolute subtration value applied from subtractor 77 with a memorized data of a memory 78b and to renew the memorized data of memory 78b with a smaller data of the compared data. A memory 78c is arranged to be applied with the count signal from counter 74b as an address signal for producing the data position of the address signal as a second position data when the memorized data of memory 78b becomes a minimum value.

Figure 11:
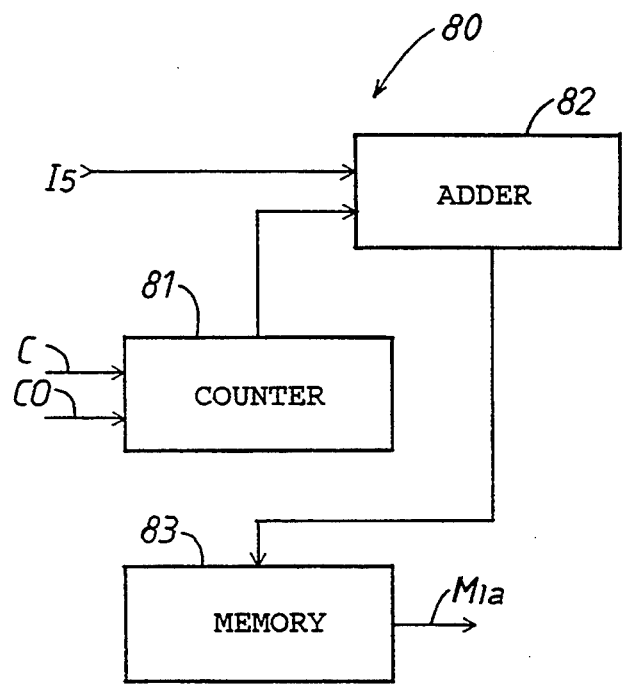
FIG. 11 is a block diagram of a first correction circuit.

As shown in FIG. 11, a correction circuit 80 includes a counter 81 which is arranged to be reset in response to the carry-out signal CO from counter 61 for counting the clock signal C from clock circuit 50. When reset by the following carry-out signal CO, the counter 81 produces the resultant of count as a count data. An adder 82 is provided to add the count data from counter 81 to the first position data from memory 68c and to store the resultant of the addition in a memory 83. The memory 83 is arranged to preliminarily memorize the first reference image data $M_1$. When applied with the resultant of the addition from adder 82 as an address data, the memory 83 issues therefrom a portion of the first reference image data $M_1$ addressed by the address data as a first corrected reference image data $M_1a$. The first corrected reference image data $M_1a$ issued from memory 83 is defined to coincide a pixel portion of the first reference image data $M_1$ corresponding with the right-hand edge 11a of the upper printed layer 11 to a pixel portion of the digital image data T corresponding with the point b shown in FIG. 2.

Figure 12:
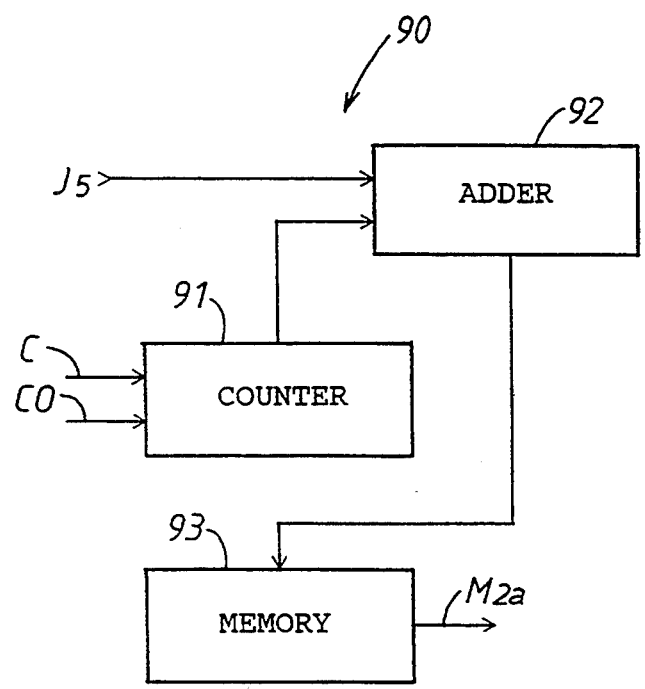
FIG. 12 is a block diagram of a second correction circuit.

As shown in FIG. 12, a correction circuit 90 includes a counter 91 which is arranged to be reset in response to the carry-out signal CO from counter 71 for counting the clock signal C from clock circuit 50 When reset by the following carry-out signal CO, the counter 91 produces the resultant of count as a count data. An adder 92 is provided to add the count data from counter 91 to the second position data from memory 78c and to store the resultant of the addition in a memory 93. The memory 93 is arranged to preliminarily memorize the second reference image data $M_2$. When applied with the resultant of addition from adder 92 as an address data the memory 93 issues therefrom a portion of the second reference image data addressed by the address data as a second corrected reference image data $M_2a$. The second corrected reference image data $M_2a$ is defined to coincide a pixel portion of the second reference image data $M_2$ corresponding with the left-hand edge 12a of the lower print layer 12 to a pixel portion of the digital image data T corresponding with the point a shown in FIG. 2.

Referring back to FIG. 1, the image processing system includes a superimposed circuit 100 in the form of an OR circuit which is applied with the first and second corrected reference image data $M_1a$, $M_2a$ respectively from correction circuits 80 and 90 as a serial data to issue therefrom a finally corrected reference image data M as a single serial data. In this ease, the finally corrected reference image data M coincides with the digital image data T at each pixel position corresponding with the right-hand edge 11a of upper printed layer 11 and the left-hand edge 12a of lower printed layer 12. The pattern matching circuit 110 is arranged to carry out a matching process of the digital image data T and finally corrected reference image data M respectively applied from the position measurement circuit 60 and superimposed circuit 100 for producing the processed data as a matching process data. A labeling circuit 120 is coupled with the pattern matching circuit 110 to calculate an area data of a discordant portion of the digital image data T and finally corrected reference image data M applied thereto from the pattern matching circuit 110. A discrimination circuit 130 is provided to discriminate whether or not the area data is larger than a reference area data. When the calculated area data is larger than the reference area data, the discrimination circuit 130 discriminates the overprinted state of the color print as poor. The reference area data for comparison with the calculated area data is determined to correspond with a maximum value representing an allowable value of defects in the overprinted state of the two-color print.

In operation of the image processing system, the clock circuit 50 is activated to successively produce a clock signal C therefrom. Assuming that the television camera 20 has been focused on the boundary of the overprinted layers 11 and 12 of the two-color print 10 under appropriate illumination to issue an electrical image data, the image input circuit 30 issues the image data as a digital image data T. In this instance, the counter 61 of the position measurement circuit 60 is applied with the clock signal C from the clock circuit 50 to produce a carry-out signal CO therefrom at each time when counted a predetermined number of clock signals C. In response to the carry-out signal CO from counter 61, the selector 62a causes the memories 63a, 63b, 63c to successively memorize the digital image data T from image input circuit 30 therein at the predetermined number of bits, while the selector 62b causes the memories 63d, 63e, 63f to successively memorize the first reference image data $M_1$ from memory 40 therein at the predetermined number of bits. On the other hand, the selector 72a of the position measurement circuit 70 causes the memories 73a, 73b, 73c to successively memorize the digital image data T in response to the carry-out signal CO from counter 71 therein at the predetermined number of bits, while the selector 72b causes the memories 73d, 73e, 73f to successively memorize therein the second reference image data $M_2$ from memory 40 in response to the carry-out signal CO from counter 71. In this instance, the digital image data T is applied to the memories 73a, 73b, 73c in sequence with delay of the time defined by the period of the carry-out signal CO. Similarly, the second reference image data $M_2$ is applied to the memories 73d, 73c, 73f in sequence with delay of the time defined by the period of the carry-out signal CO.

During the operation described above, the selector 69 of the position measurement circuit 60 reads out the memorized data of memories 63b, 63c, 63a in sequence in response to the carry-out signal CO from counter 61 and applies them as the digital image data T to the pattern matching circuit 110. Simultaneously, the window memory 64a successively issues therefrom a window coordinate signal representing each window coordinate of the first window coordinate data in response to the carry-out signal CO from counter 61, while the counter 64b is reset in response to the carry-out signal CO to count the clock signal C from clock circuit 50 for producing a count signal defined by the period of the carry-out signal CO. On the other hand, the window memory 74a of the position measurement circuit 70 successively issues therefrom a window coordinate signal representing each window coordinate of the second window coordinate data in response to the carry-out signal CO from counter 71, while the counter 74b is reset in response to the carry-out signal CO from counter 71 to count the clock signal C from clock circuit 50 for producing a count signal defined by the period of the carry-out signal CO.

Thus, the selector 66a of the position measurement circuit 60 is applied with the window coordinate signal from window memory 64a as an address signal to read out the memorized data from memories 63c, 63a, 63b in response to the carry-out signal CO from counter 61 and apply them to the subtractor 67. In this instance, the memorized data of memories 63c, 63a, 63b are addressed by the address signal from window memory 64a. On the other hand, the adder 65 successively adds a value of the count signal from counter 64b to a value of the window coordinate signal from window memory 64a to successively produce the resultant of the addition as an address signal. Thus, the selector 66b is applied with the address signal from adder 65 to successively read out the memorized data from memories 63f, 63d, 63e in response to the carry-out signal CO from counter 61 and apply them to the subtractor 67. In this instance, the memorized data of memories 63f, 63d, 63e are addressed by the address signal from adder 65.

Similarly, the selector 76a of the position measurement circuit 70 is applied with the window coordinate signal from window memory 74a as an address signal to read out the memorized data from memories 73c, 73a, 73b in response to the carry-out signal CO from counter 71 and apply them to the subtractor 77. In this instance,- the memorized data of memories 73c, 73a, 73b are addressed by the address signal from window memory 74a. On the other hand, the adder 75 successively adds a value of the count signal from counter 74b to a value of the window coordinate signal from window memory 74a to successively produce the resultant of the addition as an address signal. Thus, the selector 76b is applied with the address signal from adder 75 to successively read out the memorized data from memories 73f, 73d, 73c in response to the carry-out signal CO from counter 71 and apply them to the subtractor 77. In this instance, the memorized data of memories 73f, 73d, 73e are addressed by the address signal from adder 75.

Subsequently, the subtractor 67 of the position measurement circuit 60 calculates a difference between output data of selectors 66a and 66b and applies the calculated difference to the comparator 68a as an absolute subtraction value. On the other hand, the subtractor 77 calculates a difference between output data of selectors 76a and 76b and applies the calculated difference to the comparator 78a as an absolute subtraction value. Thus, the comparator 68a compares the absolute subtraction value from subtractor 67 with the memorized data of memory 68b to renew the memorized data of memory 68b with a smaller data of the compared data. Similarly, the comparator 78a compares the absolute subtraction value from subtractor 77 with the memorized data of memory 78b to renew the memorized data of memory 78b with a smaller data of the compared data.

During renewal of the memorized data of memories 68b and 78b, the memory 68c of the position measurement circuit 60 is applied with the count signal from counter 64b as an address signal to produce the data position of the address signal as a first position data when the memorized data of memory 68b becomes a minimum value. Similarly, the memory 78c of the position measurement circuit 70 is applied with the count signal from counter 74b as an address signal to produce the data position of the address signal as a second position data when the memorized data of memory 78b becomes a minimum value.

In the correction circuit 80, the counter 81 is reset in response to the carry-out signal CO from counter 61 to count the clock signal C from clock circuit 50 so as to produce the resultant of count as a count data when reset by the following carry-out signal CO. In the correction 90, the counter 91 is reset in response to the carry-out signal CO from counter 71 to count the clock signal C from clock circuit 50 so as to produce the resultant of count as a count data when reset by the following carry-out signal CO. Thus, the adder 82 of the correction circuit 80 adds the count data from counter 81 to the first position data from memory 68c and applies the resultant value of the addition to the memory 83, while the adder 92 of the correction circuit 90 adds the count data from counter 91 to the second position data from memory 78c and applies the resultant value of the addition to the memory 93.

When applied with the resultant value of the addition from adder 82 as an address signal, the memory 83 issues therefrom a portion of the first reference image data addressed by the address signal as a first corrected reference image data $M_{1a}$. On the other hand, the memory 93 is applied with the resultant value of the addition from adder 92 as an address signal to issue therefrom a portion of the second reference image data addressed by the address signal as a second corrected reference image data $M_{2a}$. When applied with the first and second corrected reference image data $M_1a$, $M_2a$ respectively from correction circuits 80 and 90, the superimposed circuit 100 produces a finally corrected reference image data M based on a logical sum of the corrected reference image data $M_1a$ and $M_2a$. Thus, the pattern matching circuit 110 carries out a matching process of the digital image data T and finally corrected reference image data M respectively applied from the position measurement circuit 60 and superimposed circuit 100 to apply the processed data to the labeling circuit 120 as a matching process data. When applied with the matching process data from the pattern matching circuit 110, the labeling circuit 120 calculates an area data of a discordant portion of the digital image data T and finally corrected reference image data M. Subsequently, the discrimination circuit 130 compares the calculated area data with the reference area data to determine the quality of the overprinted state of the two-color print 10.

As described in detail above, the correction circuit 80 cooperates with the position measurement circuit 60 to correct the first reference image data $M_1$ to the first corrected reference image data $M_1a$ in such a manner as to coincide a pixel portion of the first reference image data $M_1$ corresponding with the right-hand edge 11a of the upper printed layer 11 to a pixel portion of the digital image data T corresponding with the right-hand edge of the upper printed layer 11. Similarly, the correction circuit 90 cooperates with the position measurement circuit 70 to correct the second reference image data $M_2$ to the second corrected reference image data $M_2a$ in such a manner as to coincide a pixel portion of the second reference image data $M_2$ corresponding with the left-hand edge 12a of the lower printed layer 12 to a pixel portion of the digital image data T corresponding with the left-hand edge 12a of the lower printed layer 12. In addition, the superimposed circuit 100 is arranged to obtain the finally corrected reference image data M based on the logical sum of the first and second corrected reference data $M_1a$ and $M_2a$, and the pattern matching circuit 110 is arranged to carry out the matching process of the finally corrected reference image data M and the digital image data T. In accordance with the matching process, the discrimination circuit 130 cooperates with the labeling circuit 120 to discriminate the quality of the boundary between the overprinted layers 11 and 12 of the two-color print 10.

Accordingly, even if a portion of the first reference image data $M_1$ corresponding with the right-hand edge of the upper printed layer 11 is deviated from the digital image data T corresponding with the right-hand edge 11a of the upper printed layer 11 as shown by the reference numeral 11b in FIG. 3, only an error in lightness can be determined without any influence caused by the deviation at the boundary of printed layers 11, 12. In addition, the quality of the two-color print can be rapidly determined since the finally corrected reference image data M and digital image data T are processed at one time by the matching process.

Although in the above embodiment the present invention has been adapted to inspection of an overprinted state of a two-color print, it is to be noted that the present invention may be adapted to inspection of multilayer patterns of a LSI wafer or other multicolor prints.

What is claimed is:

1. An image processing system for inspection of an overprinted matter having at least first and second layers different in lightness under appropriate illumination, comprising:

image forming means for forming a digital image of a surface of the overprinted matter, said image forming means including a camera which converts an image of the surface of said overprinted matter into electrical signals;

memory means for memorizing a first reference image representing a normal image of the first layer of said overprinted matter and memorizing a second reference image representing a normal image of the second layer of said overprinted matter;

first measurement means for measuring a first deviation between a first boundary of the first reference image and a portion of the digital image produced by said image forming means, corresponding with the first boundary, and for determining the measured first deviation as a first deviation amount;

second measurement means for measuring a second deviation between a second boundary of the second reference image and a portion of the digital image corresponding with the second boundary and represented by said image forming means, and for determining the measured second deviation as a second deviation amount;

first correction means for correcting the first reference image to produce a first corrected reference image in such a manner as to eliminate the first deviation amount;

second correction means for correcting the second reference image to produce a second corrected reference image in such a manner as to eliminate the second deviation amount;

superimposing means for superimposing the first and second corrected reference images to produce a finally corrected reference image;

matching circuit means for matching the finally corrected reference image and the digital image; and discrimination means for discriminating the quality of the surface of said overprinted matter based on a result of the matching operation of said matching circuit means and producing an output signal indicative of the discrimination result.

2. An image processing system as in claim 1, wherein said first and second measurement means includes a counter and a plurality of memories, each memory memorizing the digital image at a predetermined time indicated by an output from the counter.

3. A system as in claim 2, wherein said first and second measurement means further include a subtractor for subtracting data from one of said memories in said first measurement means from data indicative of said first reference image in said memory means and for subtracting data from one of said memories in said second measurement means from data indicative of said second reference image in said memory means.

4. An image processing system as in claim 3, further comprising means for determining additional deviation amounts using other information in said memories.

5. An image processing system as in claim 1, wherein said discrimination means includes a pattern matching circuit for matching the finally corrected reference image with the digital image, determining an area of disagreement thereof, and determining whether the area is larger than a reference value, to make a determination of acceptability of the digital data.

* * * * *